(12) United States Patent
Raft et al.

(10) Patent No.: US 11,057,729 B2
(45) Date of Patent: Jul. 6, 2021

(54) COMMUNICATION DEVICE WITH POSITION-DEPENDENT SPATIAL SOURCE GENERATION, COMMUNICATION SYSTEM, AND RELATED METHOD

(71) Applicant: GN HEARING A/S, Ballerup (DK)

(72) Inventors: Casper Silbo Raft, Ballerup (DK); Søren Christian Voigt Pedersen, Ballerup (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 16/666,399

(22) Filed: Oct. 28, 2019

(65) Prior Publication Data
US 2020/0196085 A1 Jun. 18, 2020

(30) Foreign Application Priority Data
Dec. 12, 2018 (EP) .................................. 18211940

(51) Int. Cl.
| | |
|---|---|
| *H04S 7/00* | (2006.01) |
| *H04R 3/04* | (2006.01) |
| *H04S 1/00* | (2006.01) |
| *H04L 29/08* | (2006.01) |

(52) U.S. Cl.
CPC ............. *H04S 7/303* (2013.01); *H04R 3/04* (2013.01); *H04S 1/007* (2013.01); *H04L 67/12* (2013.01); *H04S 2420/01* (2013.01)

(58) Field of Classification Search
CPC .. H04R 5/033; H04R 5/02; H04R 3/12; H04S 2420/01; H04S 7/30; H04S 2400/11; H04S 7/302
USPC ........................................ 381/310, 309, 300
See application file for complete search history.

(56) References Cited

U.S. PATENT DOCUMENTS

| | | | |
|---|---|---|---|
| 5,864,481 A | 1/1999 | Gross et al. | |
| 9,980,075 B1 * | 5/2018 | Benattar | ................. H04S 7/303 |
| 10,278,003 B2 * | 4/2019 | Satongar | ................ H04R 5/033 |
| 2005/0201576 A1 | 9/2005 | Barker et al. | |
| 2015/0326963 A1 | 11/2015 | Sorensen et al. | |

(Continued)

FOREIGN PATENT DOCUMENTS

| | | |
|---|---|---|
| EP | 2 887 695 A1 | 6/2015 |
| WO | WO 2018/060549 A1 | 4/2018 |

OTHER PUBLICATIONS

Extended European Search Report dated May 20, 2019 for corresponding European Application No. 18211940.4.

*Primary Examiner* — Alexander Krzystan
(74) *Attorney, Agent, or Firm* — Vista IP Law Group, LLP

(57) ABSTRACT

A communication device includes a processor; a radio interface for connection to a radio unit; and an output interface; wherein the processor is configured to: obtain a first position signal indicative of first position of a first source; obtain a user position signal indicative of position of the user; obtain a direction signal indicative of a head direction of the user; determine a first angle between the head direction and a first direction from the user to the first source; determine a first filter function based on the first angle; apply the first filter function to a first audio signal for provision of a first left output signal and a first right output signal; and output a left signal and a right signal, wherein the left signal is based on the first left output signal, and wherein the right signal is based on the first right output signal.

20 Claims, 7 Drawing Sheets

(56) References Cited

U.S. PATENT DOCUMENTS

2017/0332186 A1\* 11/2017 Riggs .................... H04S 7/301
2018/0303190 A1\* 10/2018 Calilung ................ A42B 3/185

\* cited by examiner

COMMUNICATION DEVICE WITH POSITION-DEPENDENT SPATIAL SOURCE GENERATION, COMMUNICATION SYSTEM, AND RELATED METHOD

RELATED APPLICATION DATA

This application claims priority to, and the benefit of, European Patent Application No. 18211940.4 filed on Dec. 12, 2018. The entire disclosure of the above application is expressly incorporated by reference herein.

FIELD

The present disclosure relates to a communication device, a communication system comprising a communication device and related methods including a method of operating a communication device. In particular, the present disclosure relates to a communication device with position-dependent spatial source generation and/or spatial source positioning.

BACKGROUND

In combat situations or other stressed environments with a high noise level, it is desirable for a user to effectively protect his/her hearing while enabling the user to communicate with team mates via radio or other communication system. During combat situations or other stressed environments, a user may need to wear a hearing protection device to attenuate noise, e.g. from gunfire, machinery and other types of constant or intermittent noise.

A drawback of using radio communication is that directional cues may be lost, causing the user to struggle in locating the source of an input signal, which may be dangerous in particular in combat situations, where the risk of friendly fire is heavily increased when directional cues are lost.

SUMMARY

Accordingly, there is a need for communication devices, communication systems and methods which increases the situational awareness of a user during radio communication.

A communication device is disclosed, the communication device comprising a processor; a radio interface for connection to a radio unit; and an output interface. The processor is configured to obtain, e.g. via the radio interface, a first position signal indicative of first position of a first source; obtain, e.g. via the radio interface, a user position signal indicative of position of the user; obtain, e.g. via the radio interface and/or a sensor interface of the communication device, a direction signal indicative of a head direction of the user; determine a first angle between the head direction and a first direction from the user to the first source; determine a first filter function based on the first angle; apply the first filter function to a first audio signal for provision of a first left output signal and a first right output signal; and output a left output signal and a right output signal via the output interface. The left output signal is based on the first left output signal and/or the right output signal is based on the first right output signal.

Also disclosed is a communication system comprising a communication device as described herein, the communication system comprising a set of speakers, e.g. including a left speaker and a right speaker, for connection or connectable to the output interface of the communication device. The communication system optionally comprises a radio unit for connection or connectable to the radio interface. Further, a hearing protection system is disclosed, the hearing protection system comprising a communication device as described herein, the hearing protection system comprising a set of speakers, e.g. including a left speaker and a right speaker, for connection or connectable to the output interface of the communication device. The set of speakers may be arranged in respective ear muffs and/or earpieces of a hearing protection device.

Further, a method for operating a communication device is disclosed, the communication device comprising a processor, a radio interface for connection to a radio unit, and an output interface, the method comprising obtaining, e.g. via the radio interface, a first position signal indicative of first position of a first source; obtaining, e.g. via the radio interface and/or a position sensor of the communication device, a user position signal indicative of position of the user; obtaining, e.g. via the radio interface and/or a sensor interface of the communication device, a direction signal indicative of a head direction of the user; determining a first angle between the head direction and a first direction from the user to the first source; determining a first filter function based on the first angle; applying the first filter function to a first audio signal for provision of a first left output signal and a first right output signal; and outputting a left output signal and a right output signal via the output interface, wherein the left output signal is based on the first left output signal and/or the right output signal is based on the first right output signal.

It is an important advantage of the present disclosure that the situational awareness of a user of the communication device is enhanced in real-time, which in turn reduces decision time.

Thus, a user of the communication device, e.g. in a combat situation, experiences improved situational awareness and localization of allies/team mates, which is highly beneficial for the user/warfighter operating in enemy territories/combat situations.

Further, the user/warfighter is provided with more precise and accurate localization/directional cues, so the user/warfighter can accurately identify team mates in the surrounding area while staying protected with hearing protection device and connected.

Further, directionality of input signal(s) from different sources can be improved, e.g. in turn providing a more effective spatial separation of sources in multi-source communication devices.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 4 is an illustration of a head and a spherical coordinate system centered in the head, FIG. 6 is a flow diagram of an exemplary method according to the disclosure.

DETAILED DESCRIPTION

Figure 1:
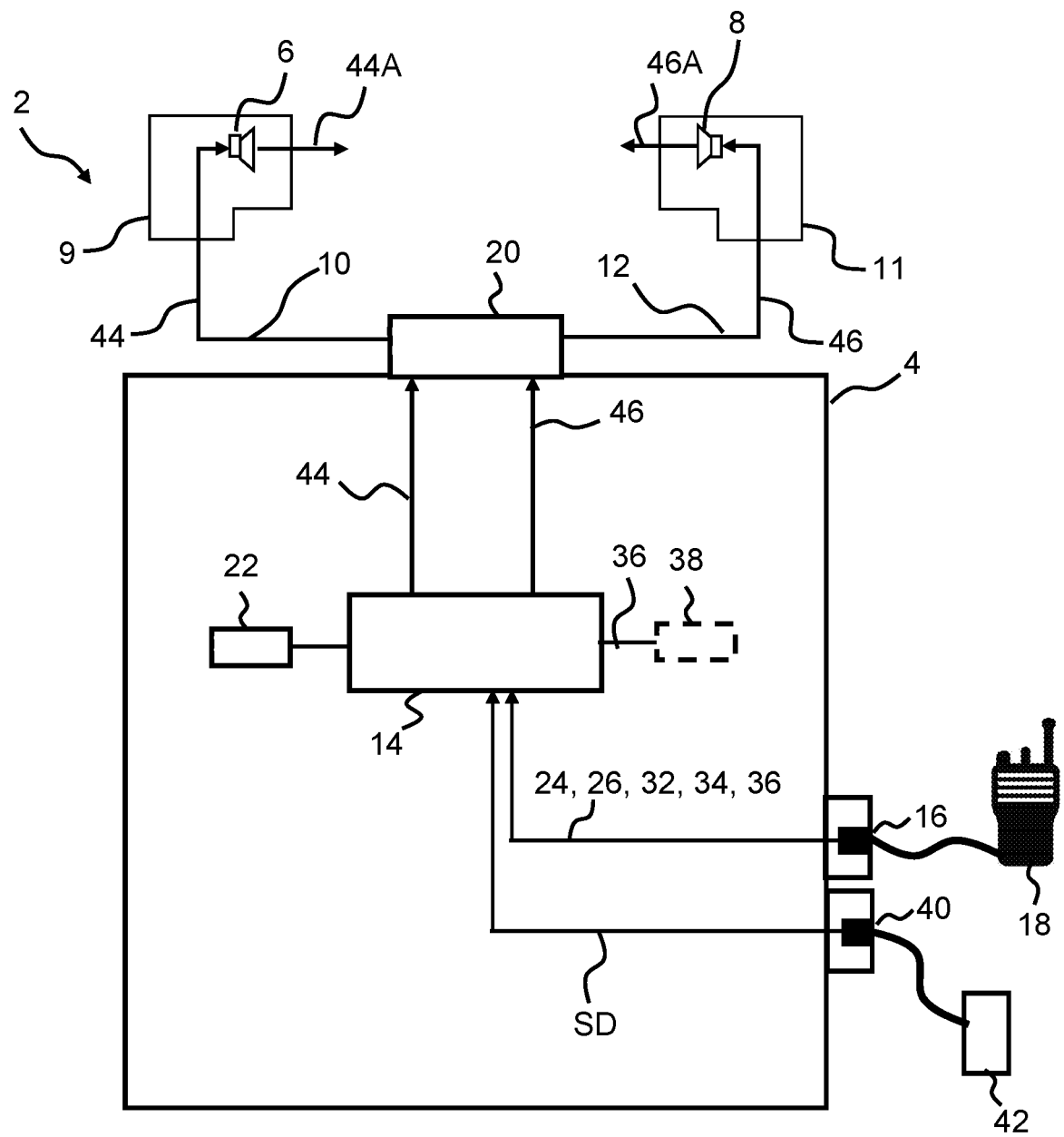
FIG. 1 schematically illustrates an exemplary communication system according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to a communication device and a method of operating a communication device. The communication device comprises a processor; a radio interface for connection to a radio unit; and an output interface.

The processor is configured to obtain, e.g. via the radio interface, a first position signal, SP_1, indicative of first position of a first source, such as a radio unit. A radio unit connected to the radio interface may provide the first position signal, e.g. by forwarding a first position of the first source received with the radio unit.

In one or more embodiments, the radio unit may comprise a GPS sensor.

The processor is configured to obtain, e.g. via the radio interface and/or a position sensor of the communication device, a user position signal, SP_U, indicative of position of the user.

The processor is configured to obtain, e.g. via the radio interface and/or a sensor interface of the communication device, a direction signal, SD, indicative of a head direction of the user. Accordingly, the communication device may comprise a sensor interface. The sensor interface may form a part of the output interface, e.g. for connection to one or more sensors arranged in a hearing protection device, such as in one or more earmuffs and/or earpieces of a hearing protection device, and configured to provide direction signal(s) indicative of head direction of the user. The one or more sensors may comprise a first accelerometer and a second accelerometer.

The processor is configured to determine a first angle, A_1, between the head direction, HD, and a first direction, D_1, from the user to the first source; and determine a first filter function FF_1 based on the first angle A_1.

The processor is configured to apply, e.g. with a first filter module of the processor, the first filter function FF_1 to a first audio signal for provision of a first left output signal and a first right output signal. In other words, the processor of the communication device may comprise a first filter module for filtering the first audio signal according to the first filter function for provision of a first left output signal and a first right output signal.

Further, the processor is configured to output a left output signal and a right output signal via the output interface, wherein the left output signal is based on the first left output signal and the right output signal is based on the first right output signal.

In one or more exemplary communication devices, to apply the first filter function to the first audio signal comprises applying a first left filter to the first audio signal for provision of the first left output signal and/or applying a first right filter to the first audio signal for provision of the first right output signal. The first left filter may be a first left head-related transfer function, HRTF_1_L, and/or the first right filter may be a first right head-related transfer function, HRTF_1_R. Accordingly, the first filter module may comprise a first left filter and/or a first right filter for filtering the first audio signal.

In one or more exemplary communication devices, to determine a first filter function based on the first angle A_1 comprises selecting, e.g. with a filter controller of the communication device, the first filter function from a set of filter functions comprising a plurality of filter functions. In other words, the processor of the communication device may comprise a filter controller for controlling filter module(s), e.g. the first filter module and optionally a second filter module, of the processor. In one or more exemplary communication devices, selecting the first filter function from a set of filter functions comprises selecting a filter function if the first angle A_1 is in a first angle range and optionally selecting a filter function if the first angle A_1 is in a second angle range, the filter function corresponding to the first angle range being different from the filter function corresponding to the second angle range. The set of filter functions may comprise at least four filter functions FF_LF, FF_LB, FF_RF, and FF_RB corresponding to respective four angle ranges (e.g. left-front angle range, left-back angle range, right-front angle range, right-back angle range). In one or more exemplary communication devices/methods, the set of filter functions may comprise at least six, such as eight filter functions, corresponding to respective angle ranges. The filter controller may set filter coefficients of the first filter module, e.g. by controlling the first filter module with a first filter function identifier.

In one or more exemplary communication devices, to obtain a direction signal, SD, indicative of a head direction, e.g. relative to a reference direction such as the North direction, of the user comprises receiving the direction signal from an external sensor device mounted on a helmet of the user. Accordingly, the sensor interface may be configured to connect to a sensor device. The external sensor device may be an electric compass, e.g. mounted on a helmet or a hearing protection device. The external sensor device may comprise one or more sensors, the one or more sensors comprising a first accelerometer and a second accelerometer. The one or more sensors may comprise a first gyroscope and/or a second gyroscope. To obtain a direction signal, SD, indicative of a head direction may comprise receiving head direction data, such as head angle, e.g. relative to a reference direction such as the North direction.

In one or more exemplary communication devices, to obtain a first position signal comprises to receive first position data from the first source via the radio unit connected to the communication device. The first position data are indicative of a first position of the first source and may comprise Global Positioning System (GPS) coordinates of the first source.

In one or more exemplary communication devices, to obtain a user position signal comprises to receive user position data from the radio unit connected to the communication device or from a positioning device of the communication device. The user position data are indicative of a position of the user (e.g. as determined by the radio unit) and may comprise Global Positioning System (GPS) coordinates of the radio unit and/or communication device. Accordingly, the communication device may comprise a positioning device for determining a position, such as GPS position, of the communication device.

In one or more exemplary communication devices, the communication device is configured to receive a first input signal from the first source via the radio unit connected to the communication device. The first audio signal may be based on the first input signal. The first input signal may be fed directly as the first audio signal or combined with other signals to form the first audio signal. The first input signal may be filtered to form the first audio signal or a part thereof.

In one or more exemplary communication devices, the communication device comprises a signal generating module for provision of a first complementing signal, and wherein the first audio signal is based on the first complementing signal. Accordingly, the processor may comprise a first pre-processing module for processing (e.g. by mixing and/or filtering) the first input signal and/or the first complementing signal to form the first audio signal.

In one or more exemplary communication devices, the processor is configured to obtain a second position signal, e.g. via the radio interface, indicative of second position of a second source. The radio unit connected to the radio interface may provide the second position signal, e.g. by forwarding a second position of the second source received with the radio unit.

The processor may be configured to determine a second angle, $A\_2$, between the head direction and a second direction, $D\_2$, from the user to the second source; and determine a second filter function, $FF\_2$ based on the second angle $A\_2$.

The processor may be configured to apply, e.g. with a second filter module of the processor, the second filter function to a second audio signal for provision of a second left output signal and a second right output signal. In other words, the processor of the communication device may comprise a second filter module for filtering the second audio signal according to the second filter function for provision of a second left output signal and a second right output signal. The left output signal may be based on the second left output signal and the right output signal may be based on the second right output signal.

In one or more exemplary communication devices, to apply the second filter function to the second audio signal comprises applying a second left filter to the second audio signal for provision of the second left output signal and/or applying a second right filter to the second audio signal for provision of the second right output signal. The second left filter may be a second left head-related transfer function, $HRTF\_2\_L$, and/or the second right filter may be a second right head-related transfer function, $HRTF\_2\_R$. Accordingly, the second filter module may comprise a second left filter and/or a second right filter for filtering the second audio signal.

In one or more exemplary communication devices, to determine a second filter function based on the second angle $A\_2$ comprises selecting, e.g. with a filter controller of the communication device, the second filter function from a set of filter functions comprising a plurality of filter functions. In other words, the processor of the communication device may comprise a filter controller for controlling the second filter module. In one or more exemplary communication devices, selecting the second filter function from a set of filter functions comprises selecting a filter function if the second angle $A\_2$ is in a first angle range and optionally selecting a filter function if the second angle $A\_2$ is in a second angle range. The set of filter functions may comprise at least four filter functions $FF\_LF$, $FF\_LB$, $FF\_RF$, and $FF\_RB$ corresponding to respective four angle ranges (e.g. left-front angle range, left-back angle range, right-front angle range, right-back angle range). In one or more exemplary communication devices/methods, the set of filter functions may comprise at least six, such as eight filter functions, corresponding to respective angle ranges. The filter controller may set filter coefficients of the second filter module, e.g. by controlling the second filter module with a second filter function identifier.

In one or more exemplary communication devices, to obtain a second position signal comprises to receive second position data from the second source via the radio unit connected to the communication device. The second position data are indicative of a second position of the second source and may comprise Global Positioning System (GPS) coordinates of the second source.

In one or more exemplary communication devices, the communication device is configured to receive a second input signal from the second source via the radio unit connected to the communication device. The second audio signal may be based on the second input signal. The second input signal may be fed directly as the second audio signal or combined with other signals to form the second audio signal. The second input signal may be filtered to form the second audio signal or a part thereof.

In one or more exemplary communication devices, the signal generating module is configured to provide a second complementing signal, and wherein the second audio signal is based on the second complementing signal. Accordingly, the processor may comprise a second pre-processing module for processing (e.g. by mixing and/or filtering) the second input signal and/or the second complementing signal to form the second audio signal.

Also disclosed is a method for operating a communication device comprising a processor, a radio interface for connection to a radio unit, and an output interface, the method comprising obtaining a first position signal, e.g. via the radio interface, indicative of first position of a first source; obtaining a user position signal, e.g. via the radio interface and/or a position sensor of the communication device, indicative of position of the user; obtaining a direction signal, e.g. via output interface and/or a sensor interface of the communication device, indicative of a head direction of the user; determining a first angle between the head direction and a first direction from the user to the first source; determining a first filter function based on the first angle; applying the first filter function to a first audio signal for provision of a first left output signal and a first right output signal; and outputting a left output signal and a right output signal via the output interface, wherein the left output signal is based on the first left output signal and the right output signal is based on the first right output signal.

In one or more exemplary methods, applying the first filter function to the first audio signal comprises applying a first left filter to the first audio signal for provision of the first left output signal, wherein the first left filter is a first left head-related transfer function; and applying a first right filter to the first audio signal for provision of the first right output signal, wherein the first right filter is a first right head-related transfer function.

In one or more exemplary methods, determining a first filter function based on the first angle comprises selecting the first filter function from a set of filter functions comprising a plurality of filter functions.

In one or more exemplary methods, obtaining a direction signal indicative of a head direction of the user comprises receiving the direction signal from an external device mounted on a helmet of the user.

In one or more exemplary methods, wherein obtaining a first position signal comprises receiving first position data from the first source via the radio unit connected to the communication device, and wherein obtaining a user position signal comprises receiving user position data from the radio unit connected to the communication device. The first position data are indicative of a first position of the first source and may comprise Global Positioning System (GPS) coordinates of the first source. The user position data are indicative of a position of the user and may comprise Global Positioning System (GPS) coordinates of the radio unit and/or communication device.

The present disclosure also provides a communication system comprising a communication device as described herein, optionally a radio unit connectable to the radio interface, and a set of speakers connectable to the output interface. The set of speakers may be arranged in a hearing protection device, e.g. in respective ear muffs and/or earpieces of a hearing protection device. The communication system may comprise a hearing protection device connectable to the output interface of the communication device.

The present disclosure described herein relates to a communication device comprising a processor configured to optionally combine an input signal from an external source such as a radio with a complementing signal, and applying a filter function based on source-position, the filter function comprising a head-related transfer function for provision of a left and a right output signal. The filter function is applied to add directional information to the input signal so that it will appear to come from a specific direction corresponding to the position of the external source.

Signals on radios and similar devices are often limited in bandwidth, and human speech on a radio channel will typically be cut off a threshold frequency, e.g. around 3-4 kHz. Head-related transfer functions and similar filter functions often contain important information (directional cues in the form of attenuation dips or peaks) at frequencies higher than such threshold frequency. This information will be lost if the filter function is applied to a limited bandwidth signal mentioned above. This may be sub-optimal since the input signal may then not appear to come from any specific direction or since different input signals from different sources may appear to come from similar directions. By combining the input signal(s) with complementing signal(s), the effective bandwidth may be extended so that applying the filter function to the audio signal signal will render improved localization of the source.

The processor is configured to apply a first filter function to the first audio signal for provision of a first left output signal and/or a first right output signal. To apply a first filter function to the first audio signal may comprise applying a first left filter to the first audio signal for provision of the first left output signal. The first left filter may be a first left head-related transfer function (HRTF_1_L). To apply a first filter function to the first audio signal may comprise applying a first right filter to the first combined signal for provision of the first right output signal. The first right filter may be a first right head-related transfer function (HRTF_1_R). Thus, the present communication device is able to effectively control the perceived direction from which the first input signal originates, i.e. the first position of the first source.

The processor may be configured to obtain or receive a second input signal from a second source via the radio interface; optionally obtain a second complementing signal; form a second audio signal based on the second input signal and optionally the second complementing signal; apply a second filter function based on the second angle to the second audio signal for provision of a second left output signal and/or a second right output signal; the second filter function optionally comprising one or more head related transfer functions, wherein the left output signal is based on the second left output signal and/or the right output signal is based on the second right output signal. Accordingly, the left output signal may be based on both the first left output signal and the second left output signal. The left output signal may be a sum or weighted sum of left output signals from the filter function(s). Accordingly, the right output signal may be based on both the first right output signal and the second right output signal. The right output signal may be a sum or weighted sum of right output signals from the filter function(s).

To apply a second filter function to the second audio signal may comprise applying a second left filter to the second audio signal for provision of the second left output signal. The second left filter may be a second left head-related transfer function (HRTF_2_L) based on the second angle. To apply a second filter function to the second audio signal may comprise applying a second right filter to the second combined signal for provision of the second right output signal. The second right filter may be a second right head-related transfer function (HRTF_2_R) based on the second angle. Thus, the present communication device provides effective and improved separation of the first input signal and the second input signal, at least when the first source and the second source are positioned in different angular positions relative to the user.

When a first input signal is obtained or received, the left output signal and the right output signal are based on the first left output signal and the first right output signal, and when a second input signal is obtained/received, the left output signal and the right output signal are based on the second left output signal and the second right output signal. When a first input signal and a second input signal are obtained/received in parallel, the left and right output signals may be based on both the first left and right output signals and the second left and right output signals.

The first filter function and the second filter function may be different, e.g. so that the first and second input signals will appear or be perceived as originating from different spatial positions or directions. Thus, the first left filter and the second left filter may be different and the first right filter and the second right filter may be different, as are the related HRTF's. In other words, the first filter function may be different from the second filter function such that a first input signal is perceived to come from a first direction and the second input signal is perceived to come from a second direction different from the first direction. The first left filter may be different from the second left filter. The first right filter may different from the second right filter.

The communication device may comprise a memory for storing a set of filter functions, e.g. as part of a look-up table, and filters to be retrieved by the processor upon application of these.

In one or more exemplary communication systems, the processor is configured to receive/obtain N input signals, where N is an integer, e.g. in a range from 2 to 8, such as 2, 3, 4, 5, 6, 7, 8. The processor may be configured to apply a respective filter function to each of the N audio signals for provision of N left output signals and N right output signals, each of the filter functions comprising one or more head related transfer functions; and output a left output signal and a right output signal via the output interface, wherein the left output signal is based on, such as a sum of, the N left output signals from and/or the right output signal is based on, such as a sum of, the N right output signal. The left output signal may be a sum of N left output signals, the N left output signals respectively based on the N input signals. The right output signal may be a sum of N right output signals, the N right output signals respectively based on the N input signals.

One or more pre-processing modules, such as the first pre-processing module and/or the second pre-processing module, of the processor may comprise an input filter for filtering an input signal. The input filter may be a low-pass filter, e.g. configured to attenuate frequencies of a respective input signal that are larger than a low-pass frequency. This may serve to cut off parts of the respective input signal that contain little or no information or have fluctuating power. Such parts of an input signal are preferably removed and compensated for by respective complementing signals that can have sufficient and predictable power in this range. The low-pass frequencies of different input filters may be in the range from 3 kHz to –4 kHz. A first low-pass frequency of a first input filter of the first pre-processing module may be the same or different from a second low-pass frequency of a second input filter of the second pre-processing module.

The communication device, such as the processor, may comprise a signal generating module for generating one or more complementing signals including a first complementing signal and/or a second complementing signal. A complementing signal may be a combination of noise signal(s) and/or signals consisting of different tones. Signals from a signal generator of the signal generating module may be used directly as complementing signals, or they may be shaped or otherwise processed by the signal generating module to form the complementing signal(s). The first complementing signal may be the same as or different from the second complementing signal. The use of different complementing signals for different input signals and/or different filter functions allows for a further improved directionality of the input signals as perceived by the user and/or reduced complexity of filter functions. The signal generating module may be integrated in the processor or form a separate unit in the communication device.

The signal generating module may comprise one or more secondary filters and/or one or more secondary gain blocks configured to process signals from one or more signal generators for forming the complementing signal(s). The secondary filter(s) may be configured to attenuate frequencies of one or more signals from the signal generator(s) that are smaller than a respective high-pass frequency. For example, the signal generating module may comprise a first secondary filter for shaping, e.g. high-pass filtering, a first noise signal from a first signal generator of the signal generating module to provide the first complementing signal. The first secondary filter may be a high-pass filter with a first high-pass frequency. The first high-pass frequency may be larger than 1 kHz, such as in the range from 2 kHz to –5 kHz. In one or more exemplary communication devices, the first high-pass frequency is in the range from 3-4 kHz. For example, the signal generating module may comprise a second secondary filter for shaping, e.g. high-pass filtering, the first noise signal or a second noise signal from a second signal generator of the signal generating module to provide the second complementing signal. The second secondary filter may be a high-pass filter with a second high-pass frequency. The second high-pass frequency may be larger than 1 kHz, such as in the range from 2 kHz to –5 kHz. In one or more exemplary communication devices, the second high-pass frequency is in the range from 3-4 kHz.

This may serve to shape the complementing signal(s) to match where the corresponding (shaped) input signal(s) has little or no power. The power spectra of the complementing signal(s) and corresponding input signal may overlap or there may be a range with no or low power between them. Preferably, the power spectrum of the complementing signal is matched to that of the (optionally shaped) input signal, so that the corresponding combined signal will not have large peaks or dips in the transition region between the input signal and the complementing signal.

The method or at least parts thereof may be performed by a communication device or a communication system as disclosed herein.

FIG. 1 shows an exemplary communication system. The communication system 2 comprises a communication device 4 and a left receiver 6 and a right receiver 8. The left receiver 6 can be part of a left earpiece 9 comprising a left connection 10, and the right receiver 8 can be part of a right earpiece 11 comprising a right connection 12. The connection 10 and 12 might be wired connections or wireless connections such as Bluetooth connections.

The communication device 4 comprises a processor 14 such as a central processing unit (CPU) or a digital signal processor (DSP); a radio interface 16 for connection to a radio unit 18; an output interface 20; and a memory 22.

The output interface 20 comprises a socket or a wireless transmitter/transceiver for connecting the receivers 6, 8 to the processor 14. The radio interface 16 comprises a socket for wired connection to the radio unit 18. In one or more exemplary communication devices, the radio interface 16 may be a wireless interface for wireless connection to the radio unit 18. The radio unit 18 provides one or more input signals 24, 26 to the processor 14. The first input signal 24 comprises auditory content associated with or originating from a first source 28 at a first position, and the second input signal 26 comprises auditory content associated with or originating from a second source 30 at a second position, see FIG. 8.

The processor 14 is configured to obtain a first position signal 32 indicative of the first position of the first source 28 and optionally a second position signal 34 indicative of the second position of the second source 30. The first position signal 32 comprises GPS coordinates of the first position, and the second position signal 34 comprises GPS coordinates of the second position. The first source 28 transmits the GPS coordinates of the first position to the radio unit 18. The second source 30 transmits the GPS coordinates of the second position to the radio unit 18.

Further, the processor 14 is configured to obtain a user position signal 36 indicative of position of the user, e.g. from the radio unit 18, which may contain a GPS sensor, connected to the communication device 4 or from optional positioning device 38, e.g. GPS sensing device, of the communication device 4. The user position signal 36 comprises GPS coordinates of the user position. It is to be noted that other position data may as well be used. The processor 14 is configured to determine a first direction D_1 from the user to the first source based on the first position data of the first position (GPS position) and the user position data of the user position (GPS position).

Figure 9:
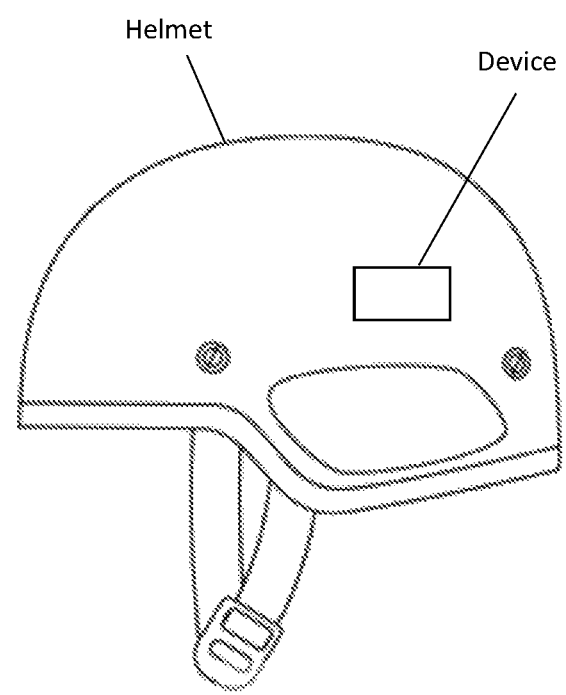
FIG. 9 discloses a helmet having an external device for providing a directional signal.

The processor 14 is configured to obtain, e.g. via a sensor interface 40 of the communication device 4, a direction signal, SD, indicative of a head direction HD of the user from an external sensor device 42 e.g. mounted on a helmet of the user (FIG. 9). The external sensor device 42 comprises a direction sensor, such as an electric compass. In one or more exemplary communication systems, the external sensor device may be integrated in earpieces or in earmuffs/headband of a hearing protection device. Accordingly, the sensor interface 40 may be integrated in or form a part of the output interface 20. The direction signal, SD, indicative of a head direction comprises a head angle relative to a reference direction such as the North direction, and the processor 14 is configured to determine a first angle, A_1, between the head direction, HD, and the first direction D_1 from the user to the first source.

The processor 14 is configured to determine a first filter function based on the first angle A_1 and apply the first filter function to a first audio signal based on the first input signal 24 for provision of a first left output signal and a first right output signal. Further, the processor 14 is configured to output a left output signal 44 and a right output signal 46 via the output interface 20, wherein the left output signal is based on the first left output signal and the right output signal is based on the first right output signal.

Figure 2:
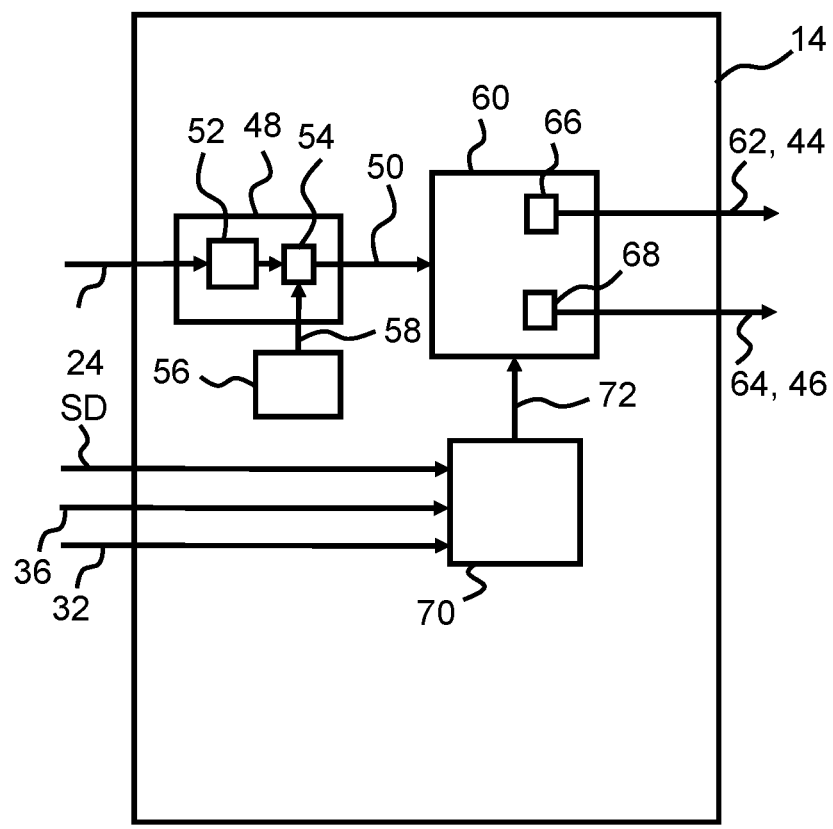
FIG. 2 is a block diagram of an exemplary processor according to the present disclosure.

FIG. 2 is a block diagram of an exemplary processor of the communication device. The processor 14 comprises a first pre-processing module 48 for forming a first audio signal 50 based on the first input signal 24. The first pre-processing module 48 optionally comprises a first input filter 52 being a low-pass filter and filtering the first input signal 24 to provide a filtered first input signal that is fed to first adder 54 for provision of the first audio signal 50 based on the first input signal 24. The processor 14 comprises a signal generating module 56 configured to provide a first complementing signal 58 that is fed to the first adder 54, the first adder 54 adding to the filtered first input signal and the first complementing signal 58 to form the first audio signal 50. The processor 14 comprises first filter module 60 with an input connected to an output of the first pre-processing module 48 for receiving the first audio signal 50. The first audio input signal 50 is filtered in the first filter module by applying a first filter function for provision of a first left output signal 62 and a first right output signal 64 that forms the left output signal 44 (or at least parts thereof) and the right output signal 46 (or at least parts thereof), respectively. To apply the first filter function in the first filter module 60 to the first audio signal 50 comprises applying a first left filter 66 to the first audio signal 50 for provision of the first left output signal 62 and applying a first right filter 68 to the first audio signal 50 for provision of the first right output signal 64. The first left filter 66 is a first left head-related transfer function, HRTF_1_L, and the first right filter 68 is a first right head-related transfer function, HRTF_1_R. Thus, the first filter module 60 comprises a first left filter 66 and a first right filter 68 for filtering the first audio signal 50.

The processor 14 comprises a filter controller 70. The filter controller 70 receives the first position signal 32, the user position signal 36, and the direction signal SD. The first controller is configured to determine a first direction D_1 from the user to the first source based on first position data of the first position signal 32 and user position data of the user position signal 36. The filter controller 70 is configured to determine a first angle A_1 between the head direction HD and a first direction D_1 from the user to the first source, and determine the first filter function applied in the first filter module 60 based on the first angle A_1. The filter controller 70 controls the first filter module to apply the first filter function by setting filter coefficients of first left and right filters 66, 68 via first control signal 72.

Figure 3:
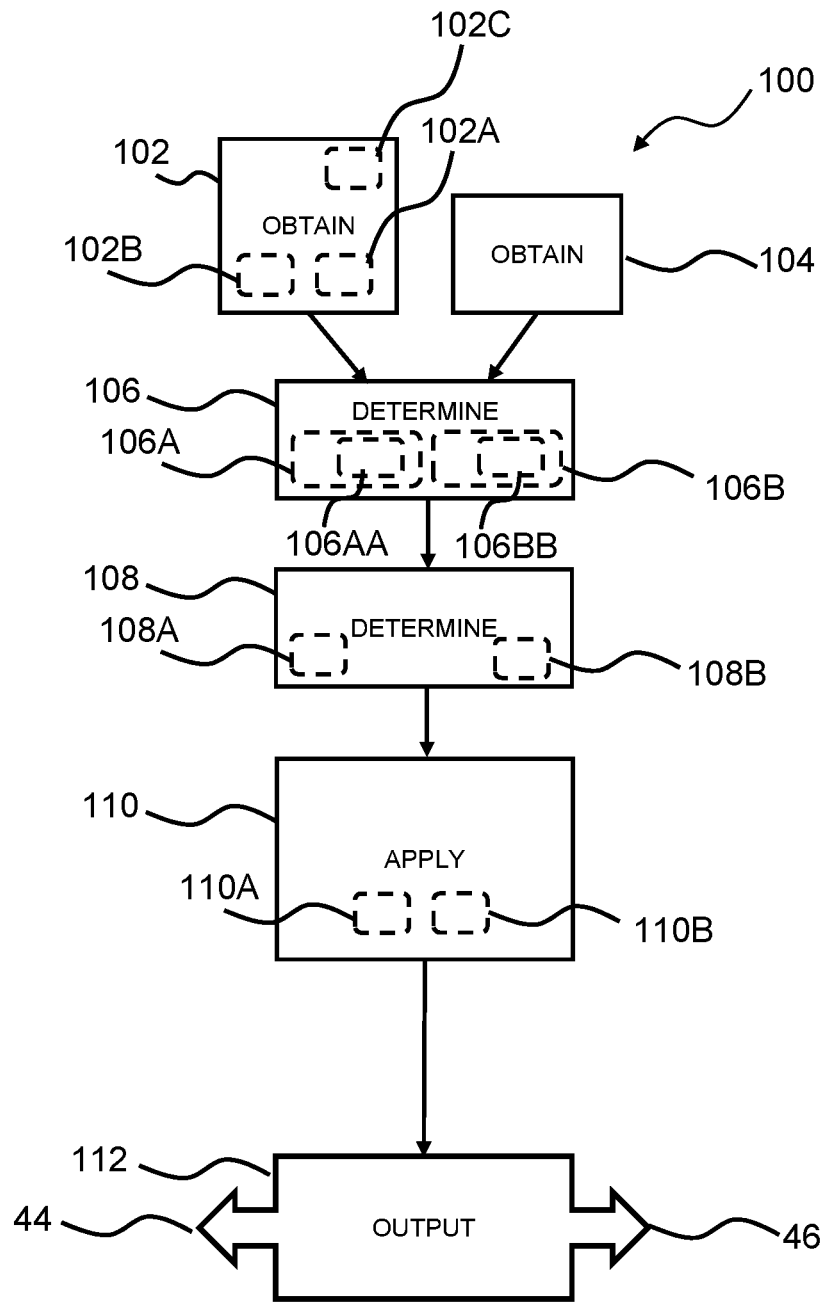
FIG. 3 is a flow diagram of an exemplary method according to the disclosure.

FIG. 3 is a flow diagram of an exemplary method of operating a communication device comprising a processor, a radio interface, and an output interface. The method 100 comprises obtaining 102 a plurality of position signals including obtaining 102A a first position signal indicative of first position of a first source, and obtaining 102B a user position signal indicative of position of the user. The method 100 comprises obtaining 104 a direction signal indicative of a head direction of the user and determining 106 a first angle between the head direction and a first direction from the user to the first source. Determining 106 angle(s) between the head direction and direction(s) from user to source(s) including determining 106A a first angle between the head direction and a first direction from the user to the first source. Determining 106A a first angle between the head direction and a first direction from the user to the first source comprises determining 106AA the first direction from the user to the first source. The method 100 proceeds to determining 108 one or more filter functions including determining 108A a first filter function based on the first angle, and applying 110 respective filter functions to respective audio signals including applying 110A the first filter function to a first audio signal for provision of a first left output signal and a first right output signal; and outputting 112 a left output signal 44 and a right output signal 46 via the output interface, wherein the left output signal is based on the first left output signal and the right output signal is based on the first right output signal.

Figure 4:
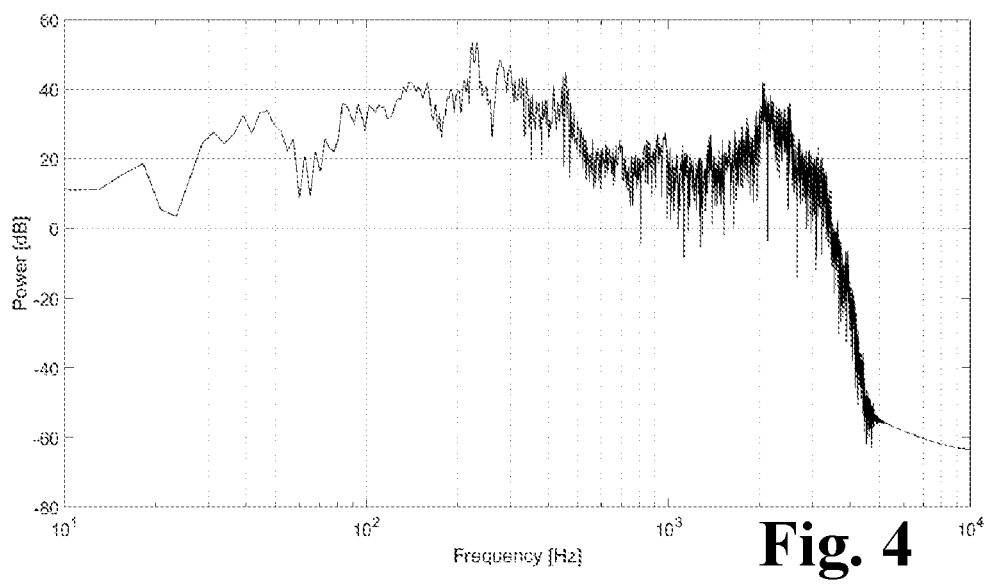
FIG. 4 is a graph illustrating a typical power spectrum of an input signal, such as the first input signal.
Figure 5:
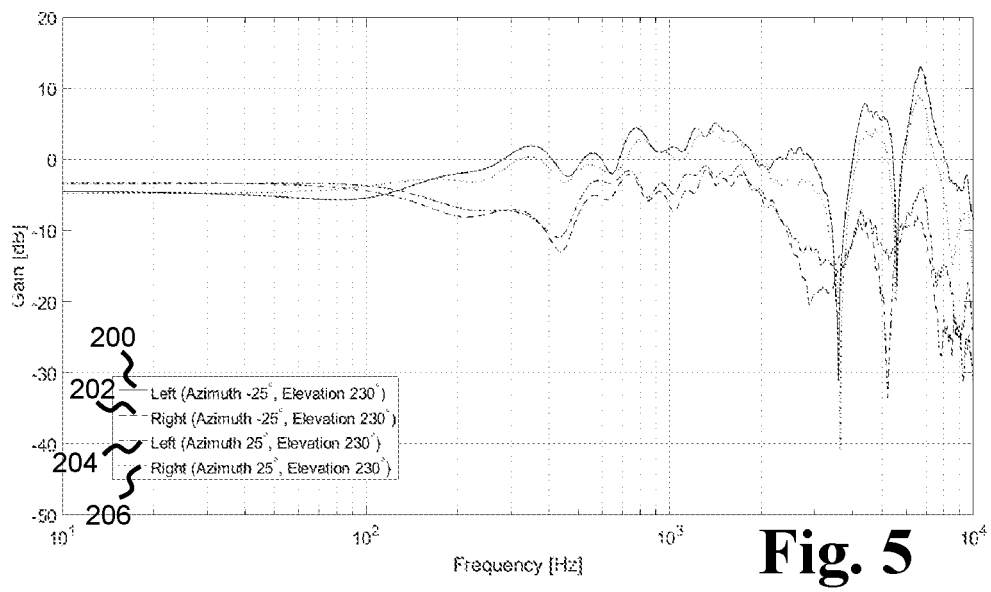
FIG. 5 is a graph illustrating four typical gain spectra for HRTFs corresponding to different angles.
Figure 6:
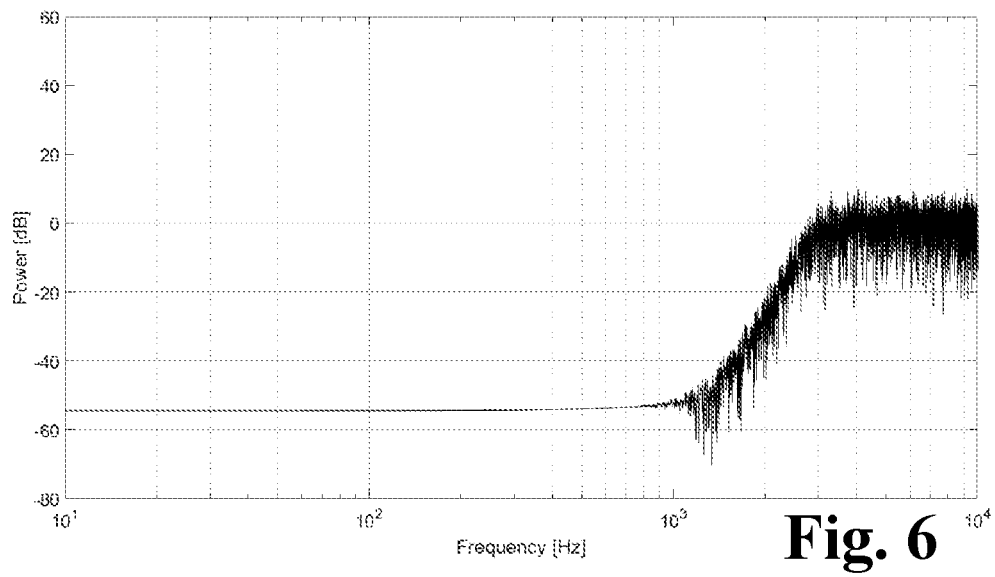
FIG. 6 is a graph illustrating a power spectrum for an exemplary complementing signal according to the disclosure.

FIG. 4 and FIG. 6 are graphs illustrating respective examples of input signals and complementing signals of the disclosure. FIG. 5 is a graph illustrating a gain spectrum of exemplary head-related transfer functions.

The first input signal and/or the second input signals are signals encoded with auditory content, typically speech. A time-averaged speech spectrum (talking over e.g. one minute) typically covers the range 100 Hz-5 kHz, with most energy in the lower (<1 kHz) frequency bands corresponding to vowel sounds and less energy in the higher-frequency bands (1-5 kHz) corresponding to consonant sounds. In addition, higher harmonics up to 15 kHz can be produced.

The bandwidth allocated for a single voice-frequency transmission channel, e.g. on a radio unit, is usually limited so that frequencies above 3.5 kHz are cut off. This is to save bandwidth and since the higher harmonics are not required for understanding speech content and distinguishing voices. FIG. 4 is a graph illustrating a typical power spectrum for speech over a radio channel, i.e. a power spectrum of an exemplary first input signal and/or second input signal. As can be seen, the power spectrum starts falling of around 3 kHz.

A head-related transfer function (HRTF), also referred to as an anatomical transfer function, shows how a human ear receives sound from a given point in space. As sound strikes the listener, several factors including the size and shape of the head, ears, ear canal, density of the head, size and shape of nasal and oral cavities, transform the sound and affect how the sound is perceived, giving rise to a transfer function being a gain spectrum with frequencies having both positive and negative gain. HRTFs are person-specific so that HRTFs corresponding to sound originating from the same direction will differ for different persons. Still, a generalized or average HRTF corresponding to sound originating from direction A will, when applied to an acoustic signal, result in different listeners to hear the sounds as coming from the same general direction. Also, two HRTFs corresponding to sound originating from two different directions will, when applied to acoustic signals, result in different listeners to hear the sounds as coming from two different directions.

FIG. 5 is a graph illustrating typical gain spectra for left/right ear HRTFs corresponding to two different directions. The directions can be derived from FIG. 5. Thus:
curve 200 is the left ear HRTF corresponding to sound originating from a back-low-left direction
curve 202 is the right ear HRTF corresponding to sound originating from a back-low-left direction
curve 204 is the left ear HRTF corresponding to sound originating from a back-low-right direction
curve 206 is the right ear HRTF corresponding to sound originating from a back-low-right direction.

It can be seen that the HRTFs contain substantial information in the range above 3-4 kHz. The information in the range >3 kHz comprises information relating to the vertical position of the source, and originates in the size, shape and vertical asymmetry of the earlobes. When a filter based on an HRTF function is applied to a first or second input signal like in FIG. 4, the information above 3-4 kHz is lost since this signal has no power in this range—in other words, there is no signal onto which this information can be encoded. Thus, applying different HRTF-based filters to different audio signals (respectively based on input signals from respective sources) will place the apparent directions of the sources of the origin in different directions.

The communication device, system, and related method according to the present disclosure optionally provide a first complementing signal to be combined with the (filtered) first input signal and allowing information of the filter function that cannot be encoded onto the first input signal to be encoded onto the combined signal. FIG. 6 is a graph illustrating a power spectrum for an exemplary first complementing signal according to the disclosure. Here, the power of the complementing signal rises in the range (3-4 kHz) where the power of the input signal in FIG. 4 drops off. Thereby, the resulting combined signal will have sufficient power over the range 80 Hz-10 kHz so that all information in the HRTF of FIG. 5 can be encoded thereon. This is advantageous since this will allow the audio signals to have apparent directions of origin according to the respective source positions.

As also described in relation to FIG. 5 and FIG. 6, a power distribution of the first complementing signal preferably overlaps the gain distribution of the first filter function, at least for frequencies in a range between a first high-pass frequency (where the first input signal power drops) and an upper threshold frequency (e.g. upper bandwidth limit of combined signal). The term overlap is meant to describe that the first complementing signal has sufficient power at frequency bands where the first filter function gain has significant peaks or dips, so that the frequency bands of the combined signal onto which these peaks and dips have been encoded have a power sufficient for hearing and interpreting directional cues by the human ear.

Figure 7:
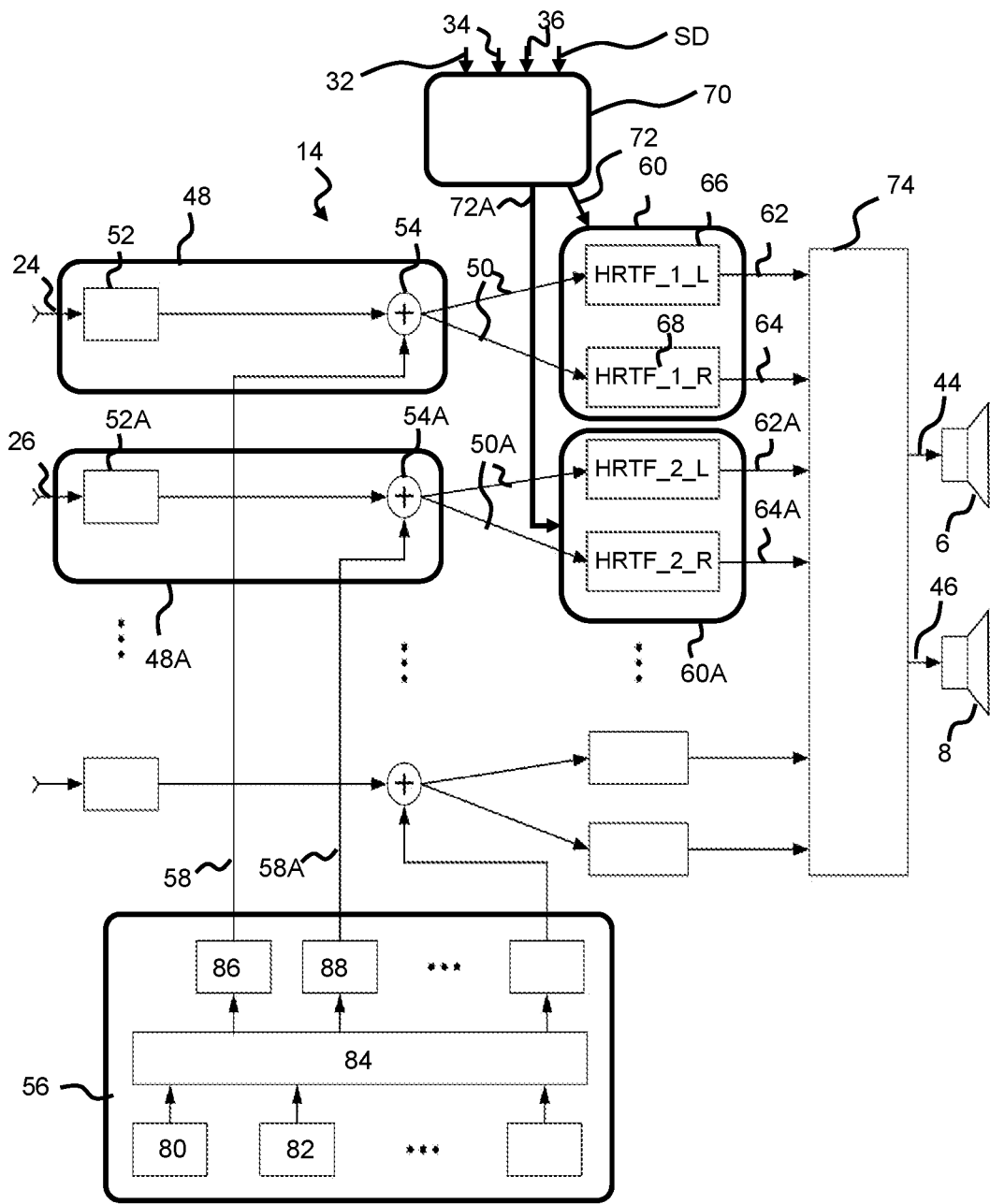
FIG. 7 is a block diagram of an exemplary processor of the communication device.

FIG. 7 is a schematic generalized block diagram of an exemplary processor. First and second input signals 24, 26 are obtained/received at radio interface 16 and fed to the processor. The processor 14 of the communication device may comprise first pre-processing module 48 used to filter, shape or otherwise process the first input signal 24 to provide first audio signal 50. The processor 14 of the communication device may comprise second pre-processing module 48A used to filter, shape or otherwise process the second input signal 26 to provide second audio signal 50A.

The second pre-processing module 48A comprises second input filter 52A and second adder 54A for provision of second audio signal 50A.

The processor 14 may comprise a signal generating module 56 for generating signals used to obtain or provide the complementing signals 58, 58A. The signal generating module 56 may comprise at least a first noise generator 80 and/or at least a first tone generator 82, as well as a multiplexer 84 that can select and combine the generated signals to be used as a basis for the complementing signals. The signal generating module 56 may be configured to generate noise signals such as white noise, pink noise, or a synthesized signal comprising multiple tones and having a desired power vs. frequency spectrum. The signal generating module 56 may thus involve several signal generators and/or synthesizers as well as an input multiplexer and/or a mixer.

The processor 14 of the communication device may comprise one or more secondary filters including first secondary filter 86 and/or second secondary filter 88 used to filter, shape or otherwise process the signals from the multiplexer 84 to provide first complementing signal 58 and optionally second complementing signal 58A. The first secondary filter 86 and the second secondary filter 88 may have respective first and second high-pass frequencies and each be configured to apply a high pass filter cutting off a lower part of the signals from the multiplexer 84 at well-defined frequencies to reduce overlap with the input signals. Each complementing signal 58, 58A may be provided with a power spectrum that provides a good overlap with the respective filter functions including specific HRTFs which will be applied to the corresponding combined signal. Different HRTF's may have significant peaks and dips in the range of the complementing signal, and since the HRTF to be applied to a given combined signal is known, the corresponding complementing signal may be designed accordingly, e.g. based on a control signal from the filter controller 70.

The processor 14 is configured to combine the filtered first input signal (or first input signal 24 if no first input filter) with the first complementing signal 58 in a first adder 54 of the first pre-processing module 48 to provide the first audio signal 50. Other mixing of the filtered first input signal (or first input signal 24 if no first input filter) and the first complementing signal 58 is contemplated. Similarly, the second pre-processing module 48A may combine the filtered second input signal (or second input signal 26 if no second input filter) with the second complementing signal 58A in a second adder 54A to provide the second audio signal 50A. Other mixing of the filtered second input signal (or second input signal 26 if no second input filter) and the second complementing signal 58a is contemplated. The processor 14 is configured to apply a first filter function with first filter module 60 to the first audio signal 50, wherein the first filter function includes a first left head-related transfer function HRTF_1_L and/or a first right head-related transfer function HRTF_1_R to provide first left output signal 62 and first right output signal 64, respectively. The processor 14 is optionally configured to apply a second filter function with second filter module 60A to the second audio signal 50A, wherein the second filter function includes a second left head-related transfer function HRTF_2_L and/or a second right head-related transfer function HRTF_2_R to provide second left output signal 62A and second right output signal 64A, respectively.

The processor 14 comprises filter controller 70 configured to control filter modules 60, 60A and in particular the first filter function and the second filter function respectively applied therein. The filter controller 70 controls filter modules based on the position signal(s) indicative of positions of respective source(s), the user position signal indicative of position of the user; and the direction signal indicative of a head direction of the user by determining angle(s) between the head direction and respective direction(s) from the user to the respective source(s), determining respective filter function(s) based on the respective angle(s), and applying the respective filter function(s) to respective audio signal(s) for provision of respective left output signal(s) and right output signal(s).

The respective left output signals and the respective second left output signals are combined, e.g. added and/or otherwise mixed, in mixer module 74 to form the left output signal 44 and the right output signal 46. The left and right output signals 44, 46 are received by respective left and right receivers 6 and 8 via output interface to form corresponding left and right audio signals 44A, 46A.

The above description describes the schematic block diagram of FIG. 7 with reference to a first input signal 24 and optionally a second input signal 26. The communication device may be configured to handle a larger number of input signals in parallel, such as 4 input signals, 6 input signals or 8 input signals, all input signals optionally being complemented and processed to have directions of origin based on position data of respective sources in order for the user to improve localization of the sources. Thus, communication device may receive a larger number of input signals as illustrated by the dots and further box in FIG. 7.

Figure 8:
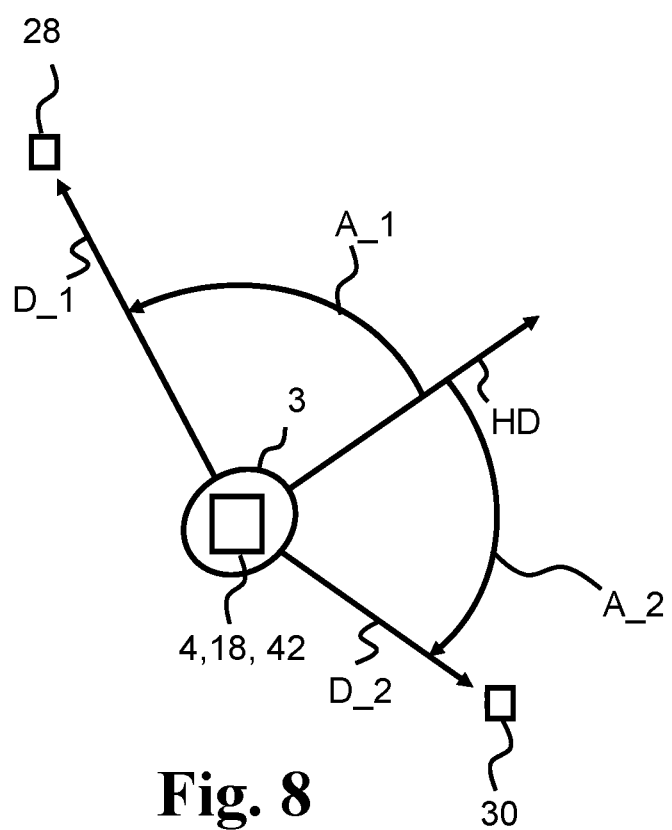
FIG. 8 illustrates an environment with a user of communication device, first source, and second source.

FIG. 8 shows an environment where a user 3 wears the communication device 4 as disclosed herein. The communication device determines first angle between head direction HD and first direction D_1 from user 3 to first source 28 and adjusts the first filter function based on the first angle. The communication device determines second angle between head direction HD and second direction D_2 from user 3 to second source 30 and adjusts the second filter function based on the second angle. The first angle A_1 corresponds to a left-front angle range, and the first filter module applies left-front HRTF's for the user to perceive the first audio signal as coming from the left-front angle range. The second angle A_2 corresponds to a right-front angle range, and the second filter module applies right-front HRTFs for the user to perceive the first audio signal as coming from the left-front angle range. When the first source moves into a first position corresponding to the first angle being in a left-back angle range, the filter controller controls the first filter module to apply left-back HRTFs for the user to perceive the first audio signal as coming from the left-back angle range.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-8 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 communication system
4 communication device
6 left receiver 8 right receiver
9 left earpiece
10 left connection
11 right earpiece
12 right connection
14 processor
16 radio interface
18 radio unit
20 output interface
22 memory
24 first input signal
26 second input signal
28 first source
30 second source
32 first position signal
34 second position signal
36 user position signal
38 positioning device
40 sensor interface
42 sensor device
44 left output signal
44A left audio signal
46 right output signal
46A right audio signal
48 first pre-processing module
48A second pre-processing module
50 first audio signal
50A second audio signal
52 first input filter
52A second input filter
54 first adder
54A second adder
56 signal generating module
58 first complementing signal
58A second complementing signal
60 first filter module
60A second filter module
62 first left output signal
62A second left output signal
64 first right output signal
64A second right output signal
66 first left filter
68 first right filter
70 filter controller
72 first control signal
72A second control signal
74 mixer module
80 first noise generator
82 first tone generator
84 multiplexer
86 first secondary filter
88 second secondary filter
100 method of operating a communication device
102 obtaining a plurality of position signals
102A obtaining a first position signal indicative of first position of a first source
102B obtaining a user position signal indicative of position of the user
102C obtaining a second position signal indicative of second position of a second source
104 obtaining a direction signal indicative of a head direction of the user
106 determining angle(s) between the head direction and direction(s) from user to source(s)
106A determining a first angle between the head direction and a first direction
106AA determining the first direction from the user to the first source
106B determining a second angle between the head direction and a second direction
106BB determining the second direction from the user to the second source
108 determining one or more filter functions
108A determining a first filter function based on the first angle
108B determining a second filter function based on the second angle
110 applying respective filter functions to respective audio signals
110A applying the first filter function to a first audio signal for provision of a first left output signal and a first right output signal
110B applying the second filter function to a second audio signal for provision of a second left output signal and a second right output signal
112 outputting a left output signal 44 and a right output signal 46 via the output interface
200 HRTF corresponding to front-low-left
202 HRTF corresponding to front-low-right
204 HRTF corresponding to front-up-left
206 HRTF corresponding to front-up-right
HD hearing direction

The invention claimed is:

1. A communication device comprising:
a processor;
a radio interface for connection to a radio unit; and
an output interface;
wherein the processor is configured to:
obtain a first position signal indicative of first position of a first tangible source;
obtain a user position signal indicative of a position of the user;
obtain a direction signal indicative of a head direction of the user;
determine a first angle between the head direction and a first direction from the user to the first tangible source;
determine a first filter function based on the first angle;
apply the first filter function to a first audio signal for provision of a first left output signal and a first right output signal; and
output a left signal and a right signal via the output interface, wherein the left signal is based on the first left output signal, and wherein the right signal is based on the first right output signal.

2. The communication device according to claim 1, wherein the processor is configured to apply the first filter function to the first audio signal by:
applying a first left filter to the first audio signal for provision of the first left output signal, wherein the first left filter is a first left head-related transfer function; and
applying a first right filter to the first audio signal for provision of the first right output signal, wherein the first right filter is a first right head-related transfer function.

3. The communication device according to claim 1, wherein the processor is configured to determine the first filter function based on the first angle by selecting the first filter function from a plurality of filter functions.

4. The communication device according to claim 1, wherein the processor is configured to obtain the direction signal indicative of the head direction of the user by receiving the direction signal from an external device mounted on a helmet of the user.

5. The communication device according to claim 1, wherein the processor is configured to obtain the first position signal by receiving first position data from the first tangible source via the radio unit connected to the communication device.

6. The communication device according to claim 1, wherein the processor is configured to obtain the user position signal by receiving user position data from the radio unit connected to the communication device.

7. The communication device according to claim 1, wherein the communication device is configured to receive a first input signal from the first tangible source via the radio unit connected to the communication device, and wherein the first audio signal is based on the first input signal.

8. The communication device according to claim 1, further comprising a signal generating module for provision of a first complementing signal, and wherein the first audio signal is based on the first complementing signal.

9. The communication device according to claim 1, wherein the processor is configured to:
obtain a second position signal indicative of second position of a second tangible source;
determine a second angle between the head direction and a second direction from the user to the second tangible source;
determine a second filter function based on the second angle; and
apply the second filter function to a second audio signal for provision of a second left output signal and a second right output signal; and
wherein the left signal is based also on the second left output signal, and wherein the right signal is also based on the second right output signal.

10. A communication system comprising the communication device according to claim 1, and a set of speakers connectable to the output interface.

11. A method performed by a communication device comprising a processor, a radio interface for connection to a radio unit, and an output interface, the method comprising:
obtaining a first position signal indicative of first position of a first tangible source;
obtaining a user position signal indicative of a position of the user;
obtaining a direction signal indicative of a head direction of the user;
determining a first angle between the head direction and a first direction from the user to the first tangible source;
determining a first filter function based on the first angle;
applying the first filter function to a first audio signal for provision of a first left output signal and a first right output signal; and
outputting a left signal and a right signal via the output interface, wherein the left signal is based on the first left output signal, and wherein the right signal is based on the first right output signal.

12. The method according to claim 11, wherein the act of applying the first filter function to the first audio signal comprises:
applying a first left filter to the first audio signal for provision of the first left output signal, wherein the first left filter is a first left head-related transfer function; and
applying a first right filter to the first audio signal for provision of the first right output signal, wherein the first right filter is a first right head-related transfer function.

13. The method according to claim 11, wherein the act of determining a first filter function based on the first angle comprises selecting the first filter function from a plurality of filter functions.

14. The method according to claim 11, wherein the act of obtaining the direction signal indicative of the head direction of the user comprises receiving the direction signal from an external device mounted on a helmet of the user.

15. The method according to claim 11, wherein the act of obtaining the first position signal comprises receiving first position data from the first tangible source via the radio unit connected to the communication device.

16. The method according to claim 11, wherein the act of obtaining the user position signal comprises receiving user position data from the radio unit connected to the communication device.

17. The communication device according to claim 1, wherein the first direction from the user to the first tangible source is based on the first position of the first tangible source.

18. The communication device according to claim 1, wherein the first position signal comprises GPS information.

19. The communication device according to claim 1, wherein the act of obtaining the first position signal comprises receiving the first position signal transmitted from another device.

20. The communication device according to claim 1, wherein the user position signal comprises GPS information.

* * * * *